United States Patent
Fiala

(10) Patent No.: US 10,396,449 B2
(45) Date of Patent: Aug. 27, 2019

(54) PHOTOVOLTAIC ELEMENT WITH AN INCLUDED RESONATOR

(71) Applicant: VYSOKE UCENI TECHNICKE V BRNE, Brno (CZ)

(72) Inventor: Pavel Fiala, Brno (CZ)

(73) Assignee: VYSOKE UCENI TECHNICKE V BRNE, Brno (CZ)

(*) Notice: Subject to any disclaimer, the term of this patent is extended or adjusted under 35 U.S.C. 154(b) by 246 days.

(21) Appl. No.: 15/367,407

(22) Filed: Dec. 2, 2016

(65) Prior Publication Data

US 2017/0125624 A1  May 4, 2017

Related U.S. Application Data

(63) Continuation-in-part of application No. 13/981,881, filed as application No. PCT/CZ2011/000076 on Aug. 3, 2011, now abandoned.

(30) Foreign Application Priority Data

Jan. 27, 2011 (CZ) .................... PV 2011-42

(51) Int. Cl.
    *H01Q 1/44* (2006.01)
    *H02S 99/00* (2014.01)

(52) U.S. Cl.
    CPC .............. *H01Q 1/44* (2013.01); *H02S 99/00* (2013.01); *Y02E 10/52* (2013.01)

(58) Field of Classification Search
    CPC . H01L 31/00; H01L 31/0232; H01L 31/0547; H01L 31/022425; H02S 40/00; H02S 40/30; H02S 99/00
    See application file for complete search history.

(56) References Cited

U.S. PATENT DOCUMENTS

| 7,688,279 | B2 | 3/2010 | Miyamoto et al. |
| 2010/0284086 | A1* | 11/2010 | Novack .................. H01Q 1/248 |
| | | | 359/580 |

(Continued)

FOREIGN PATENT DOCUMENTS

| WO | 2009/064736 A1 | 5/2009 |
| WO | 2012/100758 | 8/2012 |
| WO | 2014/040576 A2 | 3/2014 |

OTHER PUBLICATIONS

International Search Report issued in International Application No. PCT/CZ2011/000076, "A Photovoltaic Element with an Included Resonator," dated Apr. 16, 2012.

(Continued)

*Primary Examiner* — Jeffrey T Barton
*Assistant Examiner* — Daniel P Malley, Jr.
(74) *Attorney, Agent, or Firm* — Thedford I. Hitaffer; Hitaffer & Hitaffer, PLLC

(57) ABSTRACT

A photovoltaic element comprises a semiconductor structure comprising a first layer comprised of a first semiconductor material with minimum electromagnetic damping and a second layer comprised of a second semiconductor material with electromagnetic damping. An upper plane of the first layer comprises an incidence plane of an electromagnetic wave onto the semiconductor structure and the second layer continues beyond the first layer in a direction of propagation of electromagnetic radiation to receive at least a portion of the electromagnetic radiation having passed through the first layer. The photovoltaic element further comprises at least one resonator comprising a first part extending along the upper plane of the first layer and a second part extending within the first layer and the second layer. The reference electrode bordering at least a portion of the second layer is (Continued)

coupled to the second layer in the direction of propagation of the electromagnetic wave.

9 Claims, 12 Drawing Sheets

(56) References Cited

U.S. PATENT DOCUMENTS

| | | |
|---|---|---|
| 2011/0156635 A1 | 6/2011 | Hong et al. |
| 2012/0080073 A1 | 4/2012 | Kotter et al. |
| 2014/0202532 A9 | 7/2014 | Fiala |

OTHER PUBLICATIONS

International Preliminary Report on Patentability and Written Opinion issued in International Application No. PCT/CZ2011/000076, entitled "A Photovoltaic Element with an Included Resonator," dated Jul. 30, 2013.
Non-Final Office Action for U.S. Appl. No. 14/427,898, entitled "Photovoltaic Element With an Included Resonator," dated Dec. 9, 2015.
Fiala, et al, "Tuned Structures for Special THz Applications," Progress in Electromagnetics Research Symposium, Mar. 23-27, 2009, Beijing, China.
Fiala, et al, "Tuned Periodical Structures—Model, Experiments in THz Band Applied in Safety Application," PIERS Proceedings, Jul. 5-8, 2010, Cambridge, USA.
Fiala, et al., "Novel vibrational and solar energy harvesters," SPIE Newsroom, Jul. 27, 2011.
Kotter, et al, "Theory and Manufacturing Processes of Solar Nanoantenna Electromagnetic Collectors," Journal of Solar Energy Engineering, Jan. 5, 2010, vol. 132, No. 1, ASME International, US.
Corkish, et al., "Efficiency of antenna solar collection," Proceedings of the 3rd World Conference on Photovoltaic Energy Conversion: Joint Conference of 13th PV Science & Engineering Conference, 30th IEEE PV Specialists Conference, 18th European PV Solar Energy Conference; Osaka International Congress Cent, May 18, 2003, vol. 3.
Osgood III, et al., "Nanoantenna-coupled MIM nanodiodes for efficient vis/nir energy conversion," Proceedings of SPIE, Sep. 13, 2007, vol. 6652.
Fiala, et al., "Energy harvesting circuit for sensor system power supply," May 5, 2011, vol. 8066.
Cloete, et al., "Ridged cavity backed slot antenna with dielectric loading." Electronics Letters, Mar. 2, 1989, vol. 25, No. 5.
Yang, et al., "Bandwidth enhancement of microstrip antennas with metamaterial bilayered substrates," Journal of Electromagnetic Waves and Applications, Dec. 2007, vol. 21, No. 15.
International Search Report issued in International Application No. PCT/CZ2012/000105, "A Solar Element Comprising Resonator for Application in Energetics," dated May 6, 2014.
Notification Concerning Transmittal of International Preliminary Report on Patentability for International Application No. PCT/CZ2012/000105, "A Solar Element Comprising Resonator for Application in Energetics," dated Mar. 26, 2015.
International Preliminary Report on Patentability and Written Opinion issued in International Application No. PCT/CZ2012/000105, "A Solar Element Comprising Resonator for Application in Energetics," dated Mar. 17, 2015.
"Diffusion," Wikipedia, https://en.wikipedia.org/wiki/Diffusion, retrieved Nov. 29, 2016.
"Dopant Activation," Wikipedia, https://en.wikipedia.org/wiki/Dopant_Activation, retrieved Nov. 29, 2016.
"Lift-off (microtechnology)," Wikipedia, https://en.wikipedia.org/wiki/Lift-off_(microtechnology), retrieved Nov. 29, 2016.
"Doping (semiconductor)," Wikipedia, https://en.wikipedia.org/wiki/Doping_(semiconductor), retrieved Nov. 29, 2016.
"Wavelength," Wikipedia, https://en.wikipedia.org/wiki/Wavelength, retrieved Nov. 29, 2016.
"Split-ring resonator," Wikipedia, https://en.wikipedia.org/wiki/Split-ring_resonator, retrieved Nov. 29, 2016.
"Electrical resistivity and conductivity," Wikipedia, https://en.wikipedia.org/wiki/Electrical_resistivity_and_conductivity, retrieved Nov. 29, 2016.

\* cited by examiner

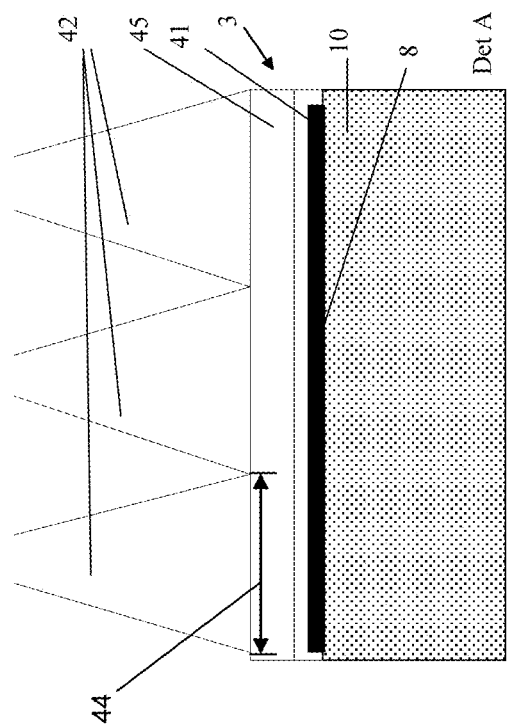
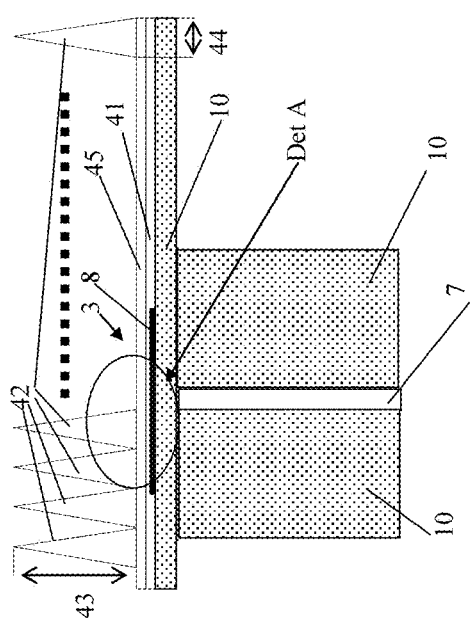

PHOTOVOLTAIC ELEMENT WITH AN INCLUDED RESONATOR

CROSS-REFERENCE TO RELATED APPLICATIONS

This application is a continuation-in-part of U.S. patent application Ser. No. 13/981,881, filed Jul. 25, 2013, which is a National Phase of International Application No. PCT/CZ11/00076, filed Aug. 3, 2011, which claims priority to Czech Republic Patent Application No. PV 2011-42, filed Jan. 27, 2011, the disclosures of which are incorporated herein by reference.

BACKGROUND OF THE INVENTION

Technical Field of the Invention

The invention relates to a photovoltaic element comprising a resonator. The element has a high transformation efficiency rate related to the transformation of the energy of light to electric energy. The element comprises a semiconductor structure located between a pair of electrodes.

State of the Art

In contemporary photovoltaics, more than fifty-year-old principles of transforming solar electromagnetic radiation (wideband electromagnetic radiation within the wavelength range of 100 nm to 10000 nm) are generally applied. Solar cells are composed of two semiconductor layers (with silicon being the usual material) located between two metal electrodes. One of the layers (an N-type material) comprises a multitude of negatively charged electrons, whereas the other layer (a P-type material) shows a large number of "holes" definable as void spaces that easily accept electrons. Devices transforming electromagnetic waves to a lower-frequency electromagnetic wave, or a direct component, are known as transverters/converters. For this purpose, semiconductor structures with differing concepts and types of architecture are applied, respecting only experimental results of the electromagnetic wave transformation effect.

Antennas, detectors, or structures designed to date are not tuned into resonance; the applied semiconductor structures face considerable difficulty in dealing with emerging standing electromagnetic waves.

Similar solutions utilize the principles of antennas as well as the transformation of a progressive electromagnetic wave to another type of electromagnetic radiation (namely, a progressive electromagnetic wave having different polarization or a standing electromagnetic wave) and its subsequent processing. Certain problems occur in connection with the impinging electromagnetic wave and its reflection as well as in relation to the wide-spectrum character of solar radiation. In general, it is not easy to construct an antenna capable of maintaining the designed characteristics in the wide spectrum for the period of several decades.

U.S. Pat. No. 8,081,931, issued Dec. 6, 2011, to Novack et al, the disclosure of which is incorporated herein by reference, discloses methods, devices, and systems for harvesting energy from electromagnetic radiation, including harvesting energy from electromagnetic radiation. In one embodiment, a device includes a substrate and one or more resonance elements disposed in or on the substrate. The resonance elements are configured to have a resonant frequency, for example, in at least one of the infrared, near infrared and visible light spectra. A layer of conductive material may be disposed over a portion of the substrate to form a ground plane. An optical resonance gap or stand-off layer may be formed between the resonance elements and the grand plane. The optical resonance gap extends a distance between the resonance elements and the layer of conductive material approximately one-quarter wavelength of a wavelength of at least one of the resonance element's resonant frequency. At least one energy transfer element may be associated with at least one resonance element.

In a publication by P. Fiala et al. entitled "Tuned Structures for Special THz Applications", in PIERS Proceedings, Beijing, CHINA, dated Mar. 23-27, 2009, particulars of new research in the special structures used for THz applications were presented. A practical application is focused on impedance matching of the basic THz structure for the wave transformation. An element produced by nanotechnology was numerically modelled and an analysis of obtained results was used for a subsequent chase of design. A final design was prepared for mid-infrared and long-infrared wavelength applications. According to the interpretation of the results, a basic design was prepared for experimental fabrication of a first prototype of nanostructure elements.

In another publication by Pavel Fiala et al. entitled "Tuned Periodical Structures—Model, Experiments in THz Band Applied in Safety Application", in PIERS Proceedings, Cambridge, USA, dated Jul. 5-8, 2010, an insight into the issues of integration and application of non-lethal weapons and devices in the field of protection against special-type weapons is provided. Structures like materials, left-handed type models were analyzed and prepared to experimental measurements.

In a publication by D. K. Kotter et al. entitled "Theory and Manufacturing Processes of Solar Nanoantenna Electromagnetic Collectors", in the Journal of Solar Energy Engineering, Vol. 132, No. 1, dated February 2010, research exploring a new and efficient approach for producing electricity from the abundant energy of the sun, using nanoantenna (nantenna) electro-magnetic collectors (NECs) is described. NEC devices target mid-infrared wavelengths, where conventional photovoltaic (PV) solar cells are inefficient and where there is an abundance of solar energy. The initial concept of designing NECs was based on the scaling of radio frequency antenna theory to infrared and visible regions. This approach initially proved unsuccessful because the optical behavior of materials in the terahertz (THz) region was overlooked and, in addition, economical nanofabrication methods were not previously available to produce optical antenna elements. This paper demonstrates progress in addressing significant technological barriers including: (1) development of frequency-dependent modeling of double-feedpoint square spiral nantenna elements, (2) selection of materials with proper THz properties, and (3) development of novel manufacturing methods that could potentially enable economical large-scale manufacturing. It has been shown that antennas can collect infrared energy and induce THz currents and cost-effective proof-of-concept fabrication techniques have been developed for the large-scale manufacture of simple square-loop nantenna arrays. Future work is planned to embed rectifiers into double-feedpoint antenna structures. This work represents an important first step toward the ultimate realization of a low-cost device that will collect as well as convert radiation into electricity. This could lead to a broadband, high conversion efficiency low-cost solution to complement conventional PV devices.

For the purpose of this application, following definitions are provided.

A semiconductor material is characterized in that its area includes moving electric charge carriers and also such carriers or conditions that restrict the extent or degree of motion and transfer of a free electric charge. These carriers or conditions are, from the electrical perspective, partially conductive in given frequency bands of applied electromagnetic wave; thus, they are semi conductive from the electrical perspective.

A dielectric is characterized in that its area includes moving charge carriers, whose number is nevertheless very low; these carriers move resulting electric charge in the area of the dielectric. The area also includes such electric charge carriers or conditions that markedly restrict or, in a limited case, wholly impede the extent or degree of motion and transfer of a free electric charge. These carriers or conditions are, from the electrical perspective, non-conductive in given frequency bands of an applied electromagnetic wave; thus, there are no free electric charge carriers (or, if otherwise, they are found only at rates below 1% of the total concentration).

A semiconductor layer can be fabricated, within chemical-technological material engineering, from materials that include, for example, inorganic, organic, macromolecular and micromolecular matter, polymers, nanoparticles, nanocomposites and nanomaterials in general, biological structures, and atomic or molecular chains or clusters and their variously combined wholes. These technologies are known as diffusion technologies of semiconductor elements of type P or N (as disclosed in a publication by H. S. Rauschenbach entitled "Solar Cell Array Design Handbook: The Principles and Technology of Photovoltaic Energy Conversion", and in U.S. Pat. No. 2,530,110, issued to J. R. Woodyard, on Nov. 14, 1959, the disclosure of which is incorporated herein by references). Furthermore, relevant technologies for the manufacture of semiconductors and semiconductor inorganic structures are lift-off processes with photoresists, developers, remover, adhesion promoters, etchants and solvents (as disclosed by MicroChemicals GmbH, Germany). Lastly, technologies for the manufacture of organic micro and macromolecular elements forming the planar and the spatial part of a resonator are known from OLED technologies (as disclosed in a publication by Zakya H. Kafai et al. entitled "Organic Electroluminescence" by CRC Press (2005)). Specific examples of chain-like amorphous materials include 4,4'-di-(1,4-buta-1,3-diynyl)benzoic acid, 4,4'4"-tris(diphenylamino)triphenylamine, 1,3,5-tris(diphenylamino)benzene and 1,3,5-tris[4-(diphenylamino)phenyl]benzene, and combinations thereof (see also a publication by Jan Čechal et al. entitled "Convergent and Divergent Two-Dimensional Coordination Networks Formed through Substrate-Activated or Quenched Alkynyl Ligation").

In a layer with minimum electromagnetic damping occurs a minimal decrease (of up to 10%) of the amplitude of the electromagnetic wave entering the specific volume of material.

In a layer with electromagnetic damping, the amplitude of a progressive electromagnetic wave decreases by at least 10%.

The planar (here denoted as "first") part of a resonator is characterized by planar fabrication. In a technical embodiment, this is a fabricated resonator in which two dimensions markedly (at least tenfold) dominate over a third dimension.

The spatial (here denoted as "second") part of a resonator is characterized by non-planar fabrication. In a technical embodiment, this is a fabricated resonator in which two dimensions do not markedly (at least tenfold) dominate over a third dimension.

A reference electrode is an electrode to which an electrode of an identical character is connected from an external area; in an internal area, the electrode assumes the function of a relating electric field, and relative electric potential is created; in a direct component of an electromagnetic wave, an electric potential will appear to which other electric potentials in a given structure are related.

A dopant material is such material which, in the exemplary embodiment with an inorganic semiconductor, causes a higher concentration of electric charge carriers.

SUMMARY OF THE INVENTION

The invention is aimed to propose a new architecture of a photovoltaic element comprising a resonator arranged on a semiconductor structure. Based on the utilized construction technology, the element resonates and produces high-value components of the electric and magnetic fields in such a manner that these components are utilizable and possible by means of well-known technologies based on classical semiconductors.

This invention is related to a photovoltaic element comprising a resonator, wherein the photovoltaic element comprises a semiconductor structure, at least one resonator and a reference electrode.

The semiconductor structure comprises a first layer comprised of a first semiconductor material with minimum electromagnetic damping and a second layer comprised of a second semiconductor material with electromagnetic damping. An upper plane of the first layer comprises an incidence plane of an electromagnetic wave onto a semiconductor structure. The second layer continues beyond the first layer in a direction of propagation of electromagnetic radiation to receive at least a portion of electromagnetic radiation having passed through the first layer.

The first semiconductor material is based on standard semiconductors, e.g. silicon, germanium, arsenic, silicon carbide or gallium arsenide, with the specific conductivity in a range from 0.0001 to 10000 mS/m. The first semiconductor material induces damping of an incident electromagnetic wave, i.e. the decrease of the amplitude of the wave, to a minimum extent (less than 10%). The second semiconductor material induces damping of an incident electromagnetic wave, i.e. the decrease of the amplitude of the wave, to more than 10% and thus prevents the formation of a standing wave. Electromagnetic damping in the second semiconductor material can be achieved by standard diffusion doping technologies of the semiconductor structure to create an N-doped or a P-doped semiconductor material in the second semiconductor material of the layer with electromagnetic damping. The doping of the material changes the conductivity to a range from 0.01 mS/m to 400 S/m. There is essentially no precise boundary between the layers, as the doping continually increases from the first towards the second semiconductor material.

The resonator comprises a first part and a second part. The first part of the resonator extends along the upper plane of the first layer, and the second part of the resonator extends within the first layer and the second layer. The second part of the resonator is inserted within the semiconductor structure by techniques known in microelectronics and microchip manufacturing, e.g. lift-off, etching, photoresist etch-off, vapor deposition, or powder deposition.

The reference electrode borders at least a portion of the second layer and continues beyond the second layer in the direction of propagation of the electromagnetic wave to receive a remaining portion of the electromagnetic wave having passed through preceding layers of the semiconductor structure.

In a preferred embodiment, the first part of the resonator is comprised of a pair of electrodes in the form of coupled conductors arranged in the upper plane on top of the first layer of the semiconductor structure. Simultaneously, the second part of the resonator is comprised of a reflector and a dielectric material, wherein the reflector is surrounded by the dielectric material, which extends within the first layer and the second layer. The dielectric material is preferably an oxide of the semiconductor material, such as silicon dioxide or germanium dioxide, or other oxides, such as aluminum oxide and combinations thereof.

Preferably, the reflector is arranged orthogonally to the upper plane of the first layer of the semiconductor structure.

In a preferred embodiment, the specific conductivity of the first semiconductor material is lower than the specific conductivity of the second semiconductor material.

The shape of the first part of the resonator can be the shape of letters U, V, I, E or C, or combinations thereof (known as split-ring resonators, see a publication by Phillipe Gay-Balmaz et al. entitled "Electromagnetic Resonances in Individual and Coupled Split-Ring Resonators" in the Journal of Applied Physics, Vol. 92, No. 5, dated Sep. 1, 2002). These shapes can be further modified by lift-off, powder or vapor deposition techniques or by deposition of thin organic polymer layers and OLED techniques known in the art to create an organic resonator. The outer dimension W of the first part is the multiple of the wavelength of the resonant incident wave ($\lambda$=700–10 000 nm) selected from the interval of from 200 to 5000 nm. The depth D of the first part is between 10 and 200 nm.

In one embodiment, the first part of the resonator is constituted by an inorganic material, e.g. gold, silver, aluminium or platinum (see FIG. 6*a*). The coupled conductors are arranged on the incidence plane as a split-ring resonator (the shape of U, V, I, E or C).

In another embodiment, the first part of the resonator comprises a layered organic material (see FIGS. 6*c* and 6*d*). The coupled conductors are arranged on the incidence plane as a split-ring resonator (the shape of letters U, V, I, E or C) and are made of polymer structures of 4,4'-di-(1,4-buta-1, 3-diynyl)benzoic acid, 4,4'4"-tris(diphenylamino)triphenylamine, 1,3,5-tris(diphenylamino)benzene and 1,3,5-tris[4-(diphenylamino)phenyl]benzene, combinations thereof and similar monomers with a benzene or aromatic ring.

In this case, before reaching the incidence plane and the first part of the resonator, the electromagnetic wave propagates through an impedance matching layer and further through a partially permeable mirror (dichroic mirror manufactured by known thin layer technologies for laser and optical systems), wherein the mirror is permeable for the wavelengths of 300 to 800 nm range in the direction of the propagating wave (50 to 99% permeability); however, the mirror is permeable is impermeable in the counter-direction of the propagating wave (50 to 99% reflectivity). The impedance matching layer may have a peak structure shape with the height of at least ¼ of the wavelength of the incident electromagnetic wave and a ratio of the height of the layer to its width at the base in a range from 3 to 30. This layer causes a uniform change in impedance of the environment and thus essentially prevents the formation of a standing electromagnetic wave, because the wave is not reflected back from the incidence plane of the first part of the resonator. The coupled conductors form the split-ring first part of the resonator and are arranged on the dielectric material.

These two embodiments utilize the spectrum of solar radiation in which the electromagnetic wave power flow density (W/m$^2$) is high, in particular in a region of wavelengths from 700 to 10 000 nm as a previously unused source of energy. The incident electromagnetic wave of such wavelengths is exploited by the photoelectric effect on the semiconductor structure. The effect induces the movement of electric charge carriers, wherein the present resonator with an inorganic layer tuned to 700-10 000 nm increases the intensity of electric (E) and magnetic field (H) components of the electromagnetic wave to such an extent that charge flowing towards the electrodes increases and charge carriers coincide with the electrodes without recombination within the structure of the photovoltaic element, thus increasing the electrode potential difference.

According to the embodiment with organic layer, the split-ring resonator makes further advantage of a photoluminescence effect that is manifested on the first part of the resonator constituted by an organic layer (benzene ring polymer structure). This photoluminescence effect causes a secondary increase in the intensity of electric (E) and magnetic field (H) components within a range of wavelengths from 300 to 800 nm and therefore amplifies the photoelectric effect originally present. Both these solutions and its results in proposed elements increase the electrode potential difference and increase exploitation of the electromagnetic spectrum in the IR region (700 to 10 000 nm) and/or increase the effectivity of the originally used photoelectric effect in a semiconductor structure. Therefore, more energy is harvested from the available electromagnetic spectrum used per surface unit of the photovoltaic element present in this invention. The advantage lies in easy tuning of the resonator and thus adapting it to the frequencies of incident electromagnetic waves.

The first and main technical purpose of the semiconductor structure in the region without electromagnetic damping and the region with electromagnetic damping is to set the conditions to prevent the superposition of the incident and reflected electromagnetic waves, namely, the generation of a standing electromagnetic wave at a non-acceptable degree, and to eliminate the described effect of the generation of a standing electromagnetic wave.

The second purpose is to create conditions for such shaping of an electromagnetic wave in which a direct component is generated via interaction of an electromagnetic wave with the semiconductor structure, characterized by the nonlinear element in FIG. 8; the conditions are created in such a manner that the electromagnetic wave will influence the motion of the electric charge carriers, the effect characterized by the nonlinear element from FIG. 8 will occur, and the direct component of the electric field will be generated.

The third purpose of the configuration lies in setting the conditions for the resonance of the resonator as the input, forming element of the incident electromagnetic wave and its propagation farther into the structure of the proposed solution of the photovoltaic element.

The state of the art includes a number of variants of infrared resonators fabricated with conductors, and the resonators are demonstrated in the exemplary embodiment. The conductors can assume such shapes and dimensions that their only characteristic is their mutual electromagnetic coupling, for example the parallel coupling in the exemplary embodiment. Here, the elementary parts of the conductor are disposed next to each other and separated from each other.

The main advantage of the newly constructed photovoltaic element with semiconductor structure is the manner of its composition, namely in the planar and spatial arrangement of the first and the second part of the resonator, respectively. This structure does not generate a backward electromagnetic wave propagating in the direction of the impinging electromagnetic wave emitted by a source such as the Sun. The resonators are designed in such a manner that they prevent the electromagnetic wave passing through the semiconductor structure from being reflected back to the resonator arranged in the structure. Thus, the resonators behave like an ideal impedance-matched antenna or an ideal energy converter for the proposed wide and arbitrarily variable frequency spectrum.

The semiconductor structure on which the resonator is arranged is comprised of two parts, namely a layer with minimum electromagnetic damping and a layer with electromagnetic damping, the layer with minimum electromagnetic damping exhibiting lower specific conductivity than the layer with electromagnetic damping, wherein the layer with electromagnetic damping functions to suppress the reflected wave. At least one resonator is arranged on the incidence plane. A first part of the resonator is arranged in an incidence plane, allowing it for the first part to be deposited on a surface of the element or incorporated in the surface of the element. The first part is also comprised of a pair of electrodes in the form of coupled conductors arranged on the incidence plane, which means that the incidence plane can be both incorporated in or deposited on the surface of the element, but on the incidence plane there is a limiting example for the surface of the structure where the electromagnetic properties for the propagating wave change. These parts ensure optimal processing of the electromagnetic wave; i.e. the occurrence of a reflected wave towards the resonator is prevented. Beyond the layer with electromagnetic damping is arranged the reference electrode.

The photovoltaic element comprising a resonator arranged on a semiconductor structure does not utilize the structure and its characteristics to generate an electric charge, but rather uses both these aspects to set suitable conditions for the impingement of the electromagnetic wave and its transformation to a stationary form of the electromagnetic field.

Another advantage comprises the fact that the dopant material increases the specific conductivity [S/m] in the semiconductor structure material. The specific conductivity increases in the semiconductor structure towards the reference electrode. Since it is assumed that a wave does not have to be comprises of only one frequency, but may comprise a whole spectrum, the resonator is tuned in such a manner that it can resonate with a wider resonance curve (see FIG. 10). At the same time, it is also very advantageous to reach a state when no back reflection of an electromagnetic wave occurs in the designed structure, and no standing wave is generated in the structure or on its surface. This effect may reduce the efficiency of the conversion of the energy transported, in the desired form, by an electromagnetic wave to the output of the device. This enables the invention—in comparison with cases when the semiconductor material is not modified as described above (see FIG. 9), to operate within a desired frequency spectrum of the impinging electromagnetic wave using a markedly lower number of tuned semiconductor structures within designed structure.

Based on the present invention, the described solution allows the adaptation of individual photovoltaic elements in the resulting structure to spectral power density conditions of the impinging electromagnetic radiation as present at the location where the elements are applied. Consequently, it is possible for to harvest the maximum energy of the incident electromagnetic radiation and to profit from the change of the radiation to the required form of energy that provides for further application (for example, as an electric energy source or generator). The designed photovoltaic elements comprising resonators are imbedded in panels which, when interconnected, can form photovoltaic fields.

Various advantages of this invention will become apparent to those skilled in the art from the following detailed description of the preferred embodiment, when read in light of the accompanying drawings.

BRIEF DESCRIPTION OF THE DRAWINGS

The principle of the invention will be clarified through the use of drawings, where FIG. 6c shows a lateral view of the resonator with organic structure, illustrating an impedance matching layer, FIG. 6d shows a detailed arrangement of layers in FIG. 6c.

DETAILED DESCRIPTION OF THE PREFERRED EMBODIMENT

The principle of constructing a photovoltaic element with a resonator arranged on a semiconductor structure will be clarified by, but not limited to the examples provided below.

Figure 1:
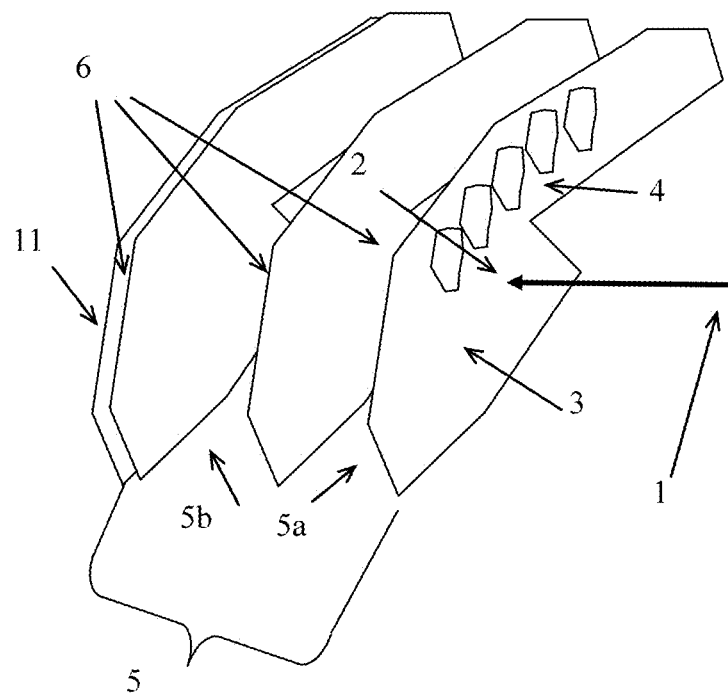
FIG. 1 shows a basic arrangement and configuration of a photovoltaic element comprising a resonator.

An exemplary embodiment of a resonator arranged on a semiconductor structure is shown in FIG. 1. In the direction of impingement of an electromagnetic wave, the photovoltaic element is comprised of the incidence plane 3 and the semiconductor structure 5 which is comprised of two parts. These two parts include a layer 5a with minimum electromagnetic damping and a layer 5b with electromagnetic damping, the layer 5a with minimum electromagnetic damping exhibiting lower specific conductivity than the layer 5b with electromagnetic damping. Furthermore, the semiconductor structure 5 comprises at least one resonator 4. Beyond the layer 5b with electromagnetic damping is arranged a reference electrode 11.

Figure 4:
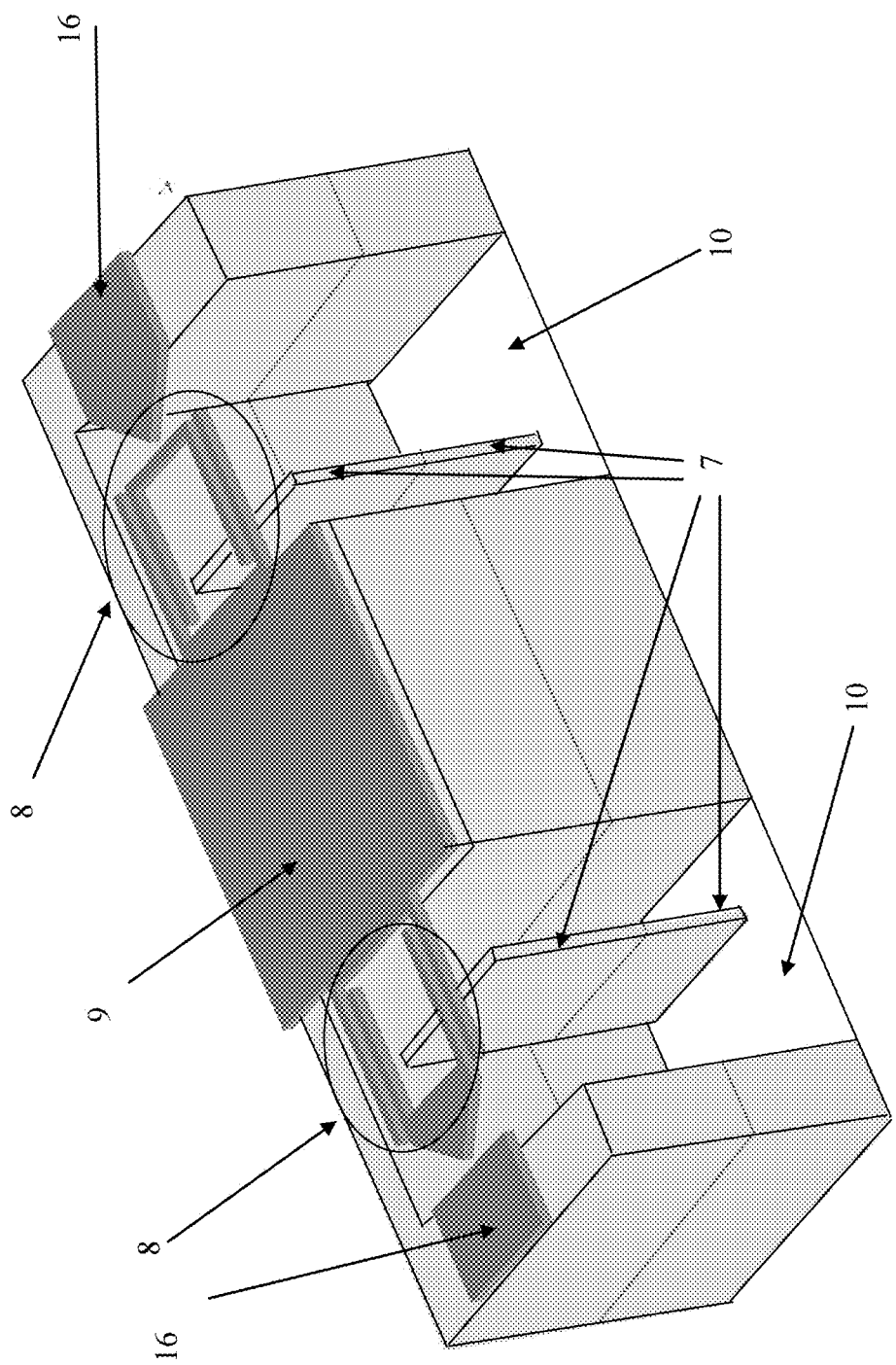
FIG. 4 illustrates the configuration of the resonator and the reflector.
Figure 5:
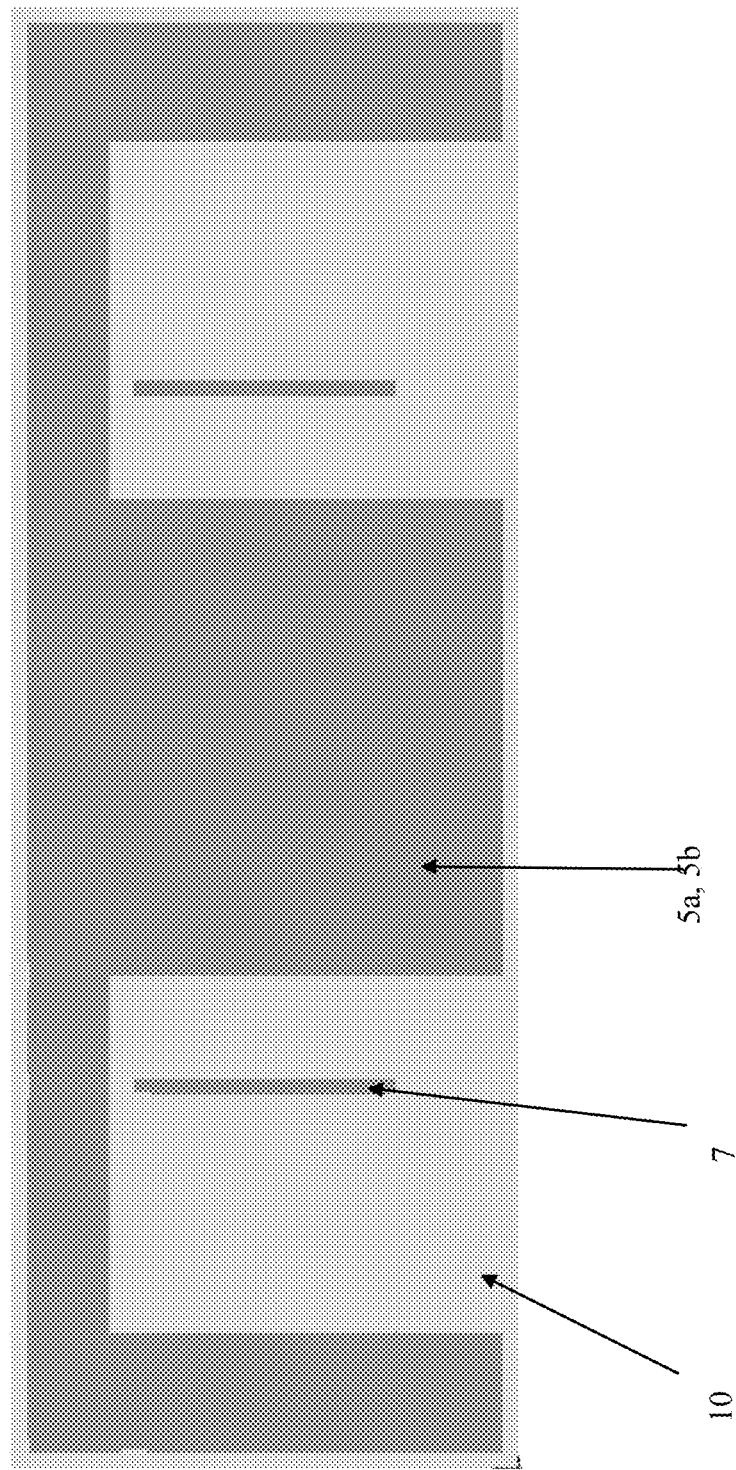
FIG. 5 presents a view from the direction of incidence of an electromagnetic wave on a first part of the resonator and shows a spatial arrangement of a second part of the resonator within a layer with minimum electromagnetic dampening and within a layer without electromagnetic dampening in the structure of the photovoltaic element.
Figure 6B:
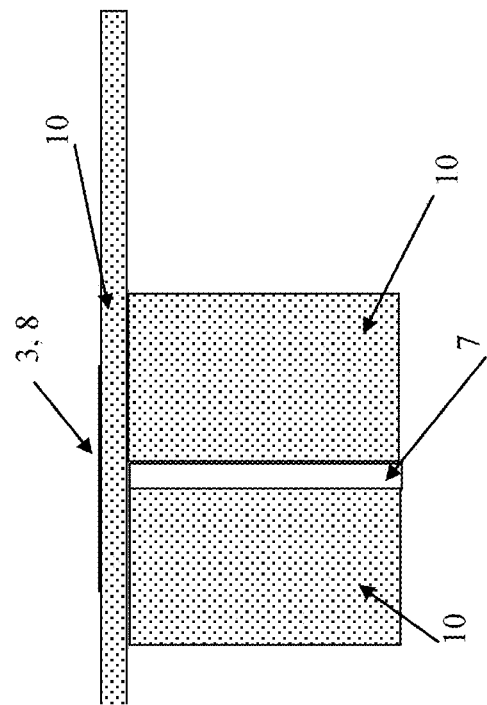
FIG. 6b shows a lateral view of the resonator.
Figure 6A:
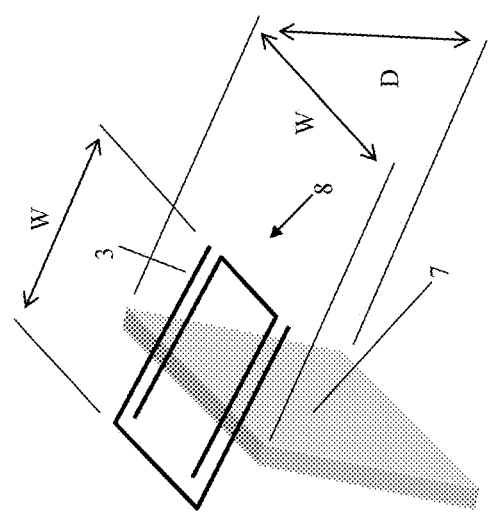
FIG. 6a illustrates an axonometric view of the resonator (formed by a reflector) above which a dielectric material and coupled conductors are arranged.
Figure 7A:
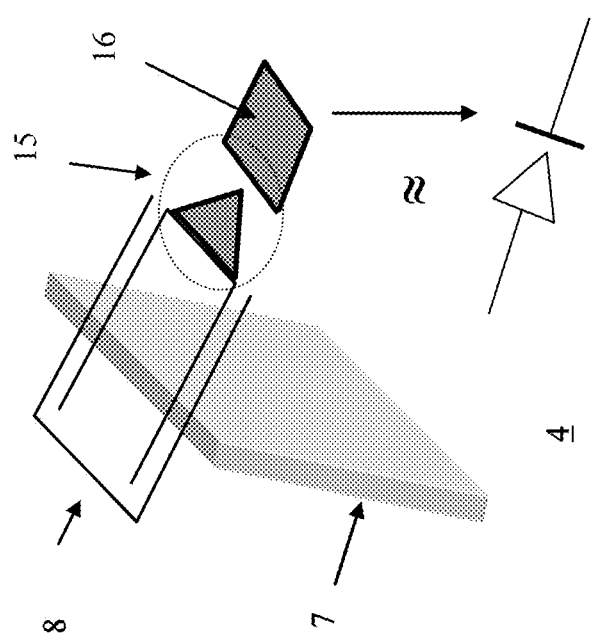
FIG. 7a illustrates a connection of coupled conductors with a nonlinear element in a forward direction.
Figure 7B:
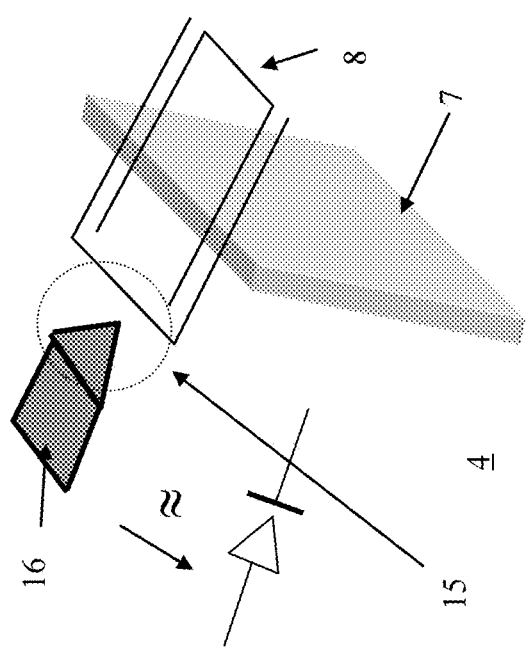
FIG. 7b illustrates a connection of coupled conductors with a nonlinear element in a backward direction.

The resonator 4 is described in more detail with reference to FIG. 4, FIG. 6a and FIG. 6b. In one embodiment, a first part (made of inorganic materials, such as gold, silver, aluminium or platinum) of the resonator 4 is comprised of a first pair of electrodes in the form of first coupled conductors 8 arranged in the incidence plane 3 on top of the layer 5a with minimum electromagnetic damping, and a second part of the resonator 4 is comprised of a reflector 7 and a dielectric material 10. The reflector 7 is surrounded by the dielectric material 10 of the resonator 4 within the layer 5a of the semiconductor structure. Furthermore, the reflector 7 is arranged orthogonally to the incidence plane 3 of the layer 5a. FIG. 5 shows an arrangement of the dielectric material 10 within the semiconductor structure. The resonator 4 produces electric current or voltage, which is conducted by the help of a nonlinear element 15 to a connecting element 16; this situation can be seen in FIGS. 7a and 7b, where both types of polarization of the nonlinear element 15 are described.

Another embodiment of the resonator 4 is represented by FIGS. 6c and 6d. A first part of the resonator 4 is comprised of a layered organic material 41, coupled to a partially permeable mirror 45. The coupled conductors 8 are arranged on an incidence plane 3 as a split-ring resonator (the shape of letters U, V, I, E or C) and are made of polymer structures based on a benzene ring, e.g. of 4,4'-di-(1,4-buta-1,3-diynyl) benzoic acid, 4,4'4"-tris (diphenylamino) triphenylamine, 1,3,5-tris (diphenylamino) benzene and 1,3,5-tris [4-(diphenylamino) phenyl] benzene, or combinations thereof. The electromagnetic wave propagates through an impedance matching layer 42, through the partially permeable mirror 45 before reaching the incidence plane 3 and the first part of the resonator 4. The impedance matching layer 42 has a peak structure shape with the height 43 of at least ¼ of the wavelength of the incident electromagnetic wave and a ratio of the height of the layer to its width 44 at its base being in a range from 3 to 30. This layer 42 causes a uniform change in impedance and thus essentially prevents the formation of a standing electromagnetic wave. The coupled conductors 8 form the split-ring first part of the resonator 4 and are arranged on dielectric material 10.

Example parameters of one embodiment of the solar element tuned to 3000 nm are provided herein. The conductive part (shown in dark grey layers in FIGS. 3 and 4), i.e., the first part of a resonator 4 with two pairs of coupled conductors 8, the connecting elements 16 and the connecting element 9 comprising the upper conductive part, as well as a reference electrode 11 comprising the lower conductive part (dark grey in FIG. 3) have thickness of 100 nm each. Planar dimensions of the two connected resonators 4, including the two pairs of coupled conductors 8, the connecting element 9 and two connecting elements 16, are 6000 nm×1500 nm, wherein the connecting element 9 alone has planar dimensions of 1500 nm×1500 nm, one pair of coupled conductors alone has planar dimensions of 1500 nm×1500 nm and one connecting element 16 alone has planar dimensions of 600 nm×750 nm. The reference electrode 11 has planar dimensions of 1500 nm×1500 nm. The thickness of the layered semiconductor structure 5 (i.e. the layers 5a, 5b and the reference electrode 11) is 300 nm and the material is silicon, diffusion-doped from the bottom part of layer 5b towards the top part of layer 5b. The relative permittivity of the dielectric material 10 (in this case, $SiO_2$) is 3.9, but in general may be in ab range from 2.5 to 4.2. The specific conductivity of a first semiconductor material of the layer 5a is 4000 mS/m and that of a second semiconductor material of layer 5b is 400 S/m, i.e. a 100-fold increase in the specific conductivity.

Figure 8:
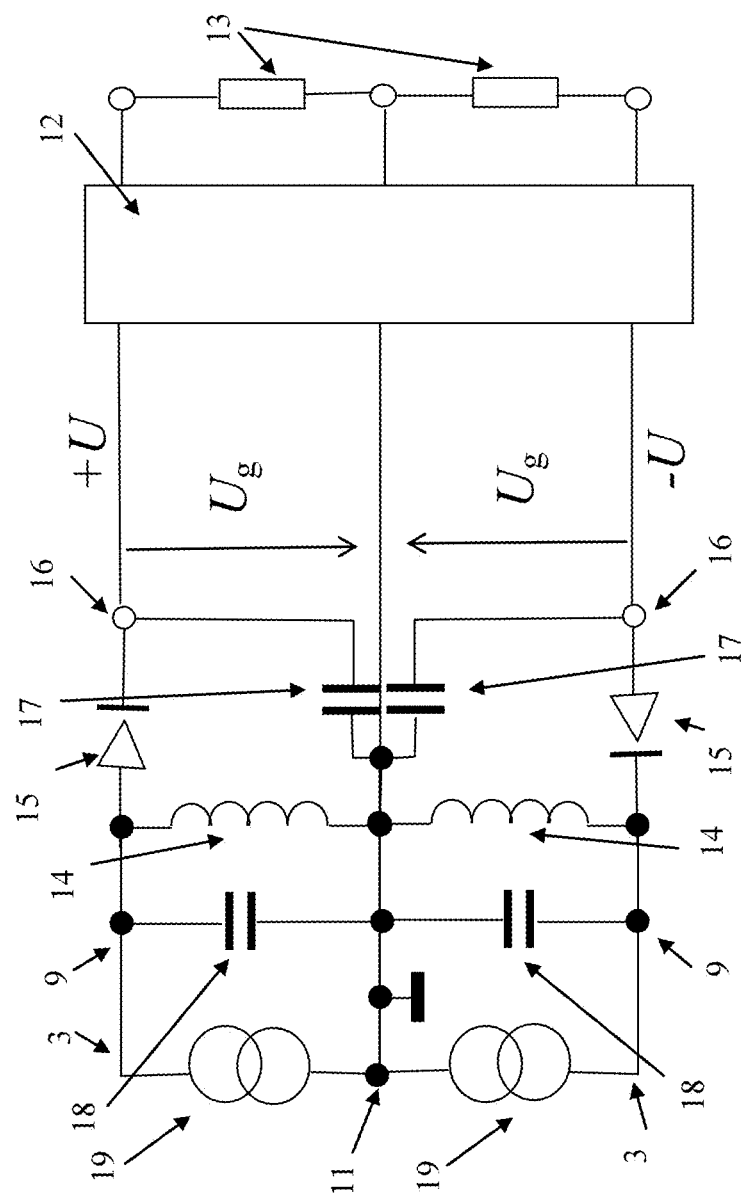
FIG. 8 represents an electrical equivalent diagram of the system and thus its operation and structure by means of a circuit scheme equivalent to the actual structure of the system.
Figure 9:
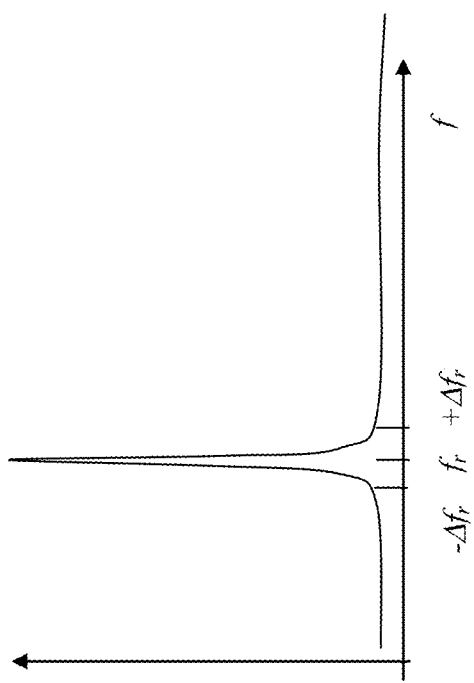
FIG. 9 illustrates a resonance curve of an unmodified resonator.

FIG. 8 represents an electrically equivalent diagram of the system with reference to its operation and structure by means of a circuit scheme equivalent to the actual structure of the system. The variants concerned are principally a one-way or two-way rectifier, a shaper, or a signal filter. These types of connections are widely known. A source 19 of alternating current or voltage caused by induction from an electromagnetic wave is connected parallelly to a first capacitor 18 and an inductor 14, which in the connection are comprised of a condenser and a coil. These components then create a tuned alternating circuit (a circuit which is tuned to the characteristics and parameters of the incident electromagnetic wave and which resonates). The nonlinear element 15 shapes the signal on the resonant circuit; this signal is then filtered (rectified) to a further utilizable shape. As the next step, connection to a second capacitor 17 is realized; in the connection, the capacitor is comprised of a condenser. Also, in the connection, connecting elements 16 are indicated. These elements 16 show electric voltage +U, −U. If a selected electric impedance load 13 in the form of electric impedance Z is connected to the connecting elements 16 (such as clamps), a variation in the resonant circuit occurs and the resonator may change its characteristics to such an extent that it will not be in a suitable resonance mode. Therefore, an electric circuit 12 is introduced before the electric impedance load 13. With any loading by electric impedance Z on its output, this circuit will cause the resonator with the nonlinear element 15 and the second capacitor 17 to be loaded by one and the same value of impedance Zi on the output which will not change the set mode of the resonator.

Figure 2:
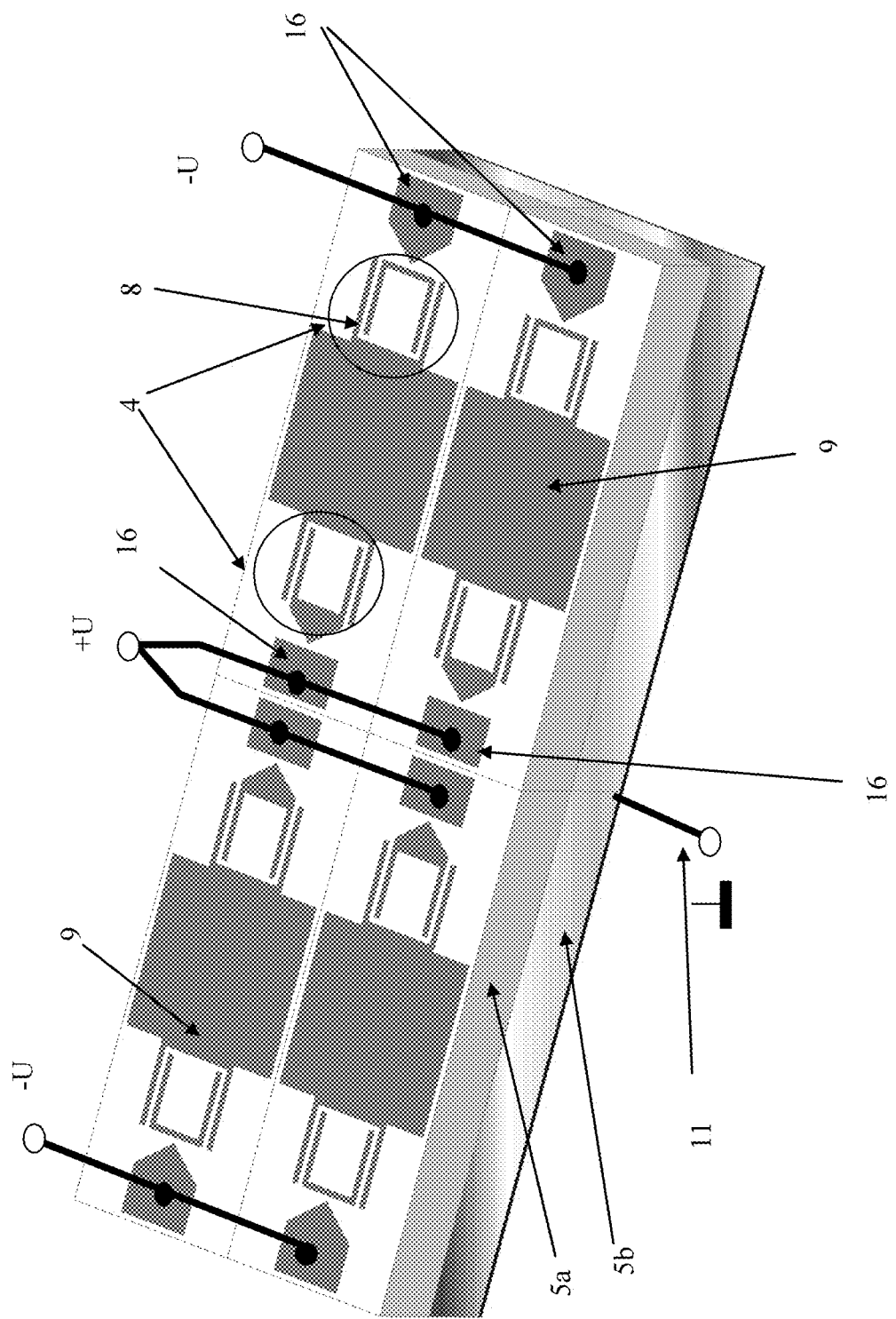
FIG. 2 illustrates an exemplary embodiment of a photovoltaic element comprising a plurality of resonators and connecting elements arranged on a semiconductor structure.

The function of the photovoltaic element comprising the resonator 4 arranged on the semiconductor structure 5, is as follows: An electromagnetic wave 1 within a wavelength range of 100 nm to 100000 nm impinges at the wave impingement or incidence point 2 on the incidence plane 3 of the layer 5a. The At least one resonator 4 is periodically repeated (as shown in FIG. 1 and FIG. 2) and arranged in the incidence plane 3. These resonators may operate individually, or as an interconnection between the resonators, thus creating a field of periodically repeated photovoltaic elements. Along the incidence plane 3, these resonators are connected in parallel or in series, with the formation of at least two resonators 4 on one photovoltaic element appearing to be an advantageous solution. These resonators are interconnected by means of a connecting element 9.

An electromagnetic wave 1 impinges at the wave impingement point 2 on the incidence plane 3. Here, the electric and magnetic components of the electromagnetic wave 1 decompose and form the maxima of intensities of the electric and the magnetic fields. This process is realized due to the designed shape of the reflector 7, which may be formed by a thin layer, a cuboid, a pyramid, a cone, a toroid, or a sphere, or a combination, part or intersection thereof. The surface of the reflector 7 may be formed by a layer of a dielectric material, metal, or a combination and shape variety of both (the components being part of the resonator 4). In order for the above-mentioned maxima of intensities to add up arithmetically (superpose) when a connection of two periodically repeated resonators 4 is realized, these resonators are connected via the connecting element 9 (as shown in FIG. 2). This figure shows an example of the proposed photovoltaic element comprising the resonator 4 arranged on a semiconductor structure 5, where two resonators 4 are arranged at the location of the incidence plane 3. These resonators are periodically repeated on other semiconductor structures 5; also, the resonators 4 are interconnected by means of connecting elements 9.

Figure 3:
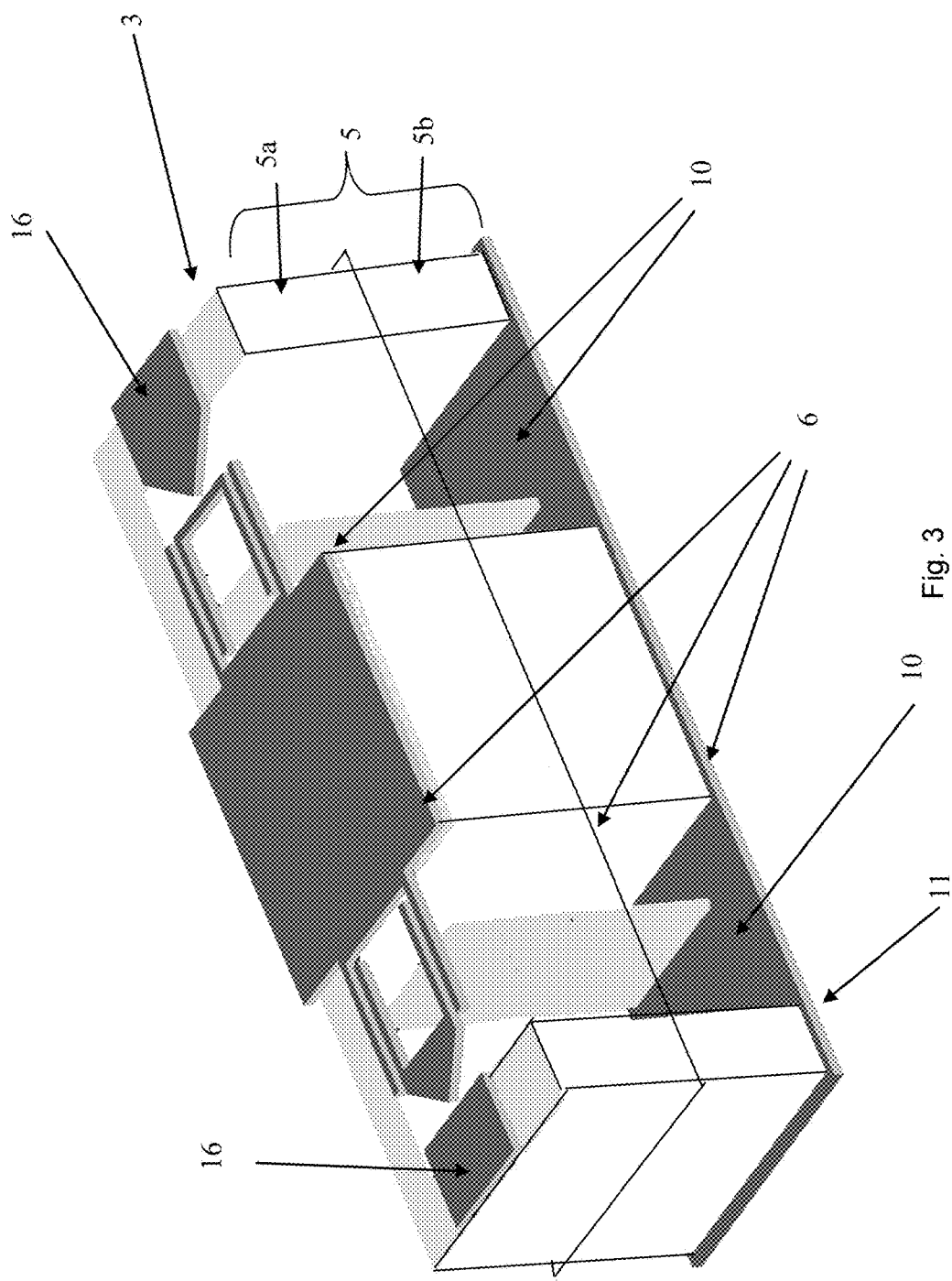
FIG. 3 shows a schematic view of the resonator arranged on the semiconductor structure.
Figure 10:
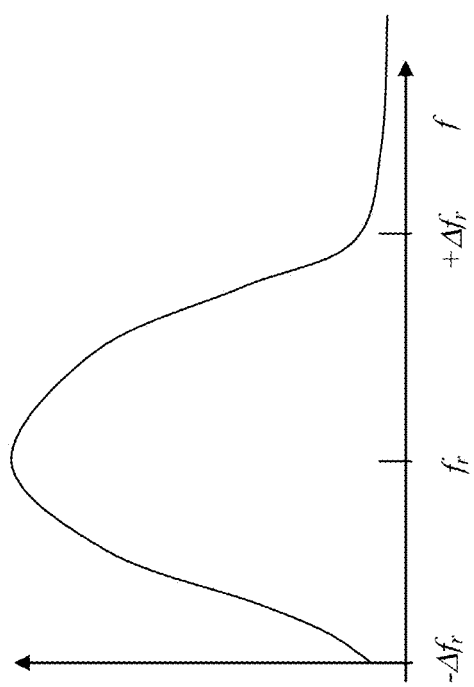
FIG. 10 shows a resonance curve of the proposed resonator.

In one embodiment of the system, as shown in FIG. 3, the resonator 4 is arranged on a semiconductor structure 5. This structure is comprised of two parts, namely the layer 5a with minimum electromagnetic damping and the layer 5b with electromagnetic damping. Mutual arrangement of individual parts of the photovoltaic element is shown in FIG. 4. The resonator 4 is comprised of two parts, wherein the first part is comprised of a pair of electrodes in the form of coupled conductors 8 and the second part is comprised of the reflector 7 and the dielectric material 10. The resonator 4 is further embedded in the semiconductor structure 5; the geometry is designed in dependence on the wavelength of the impinging electromagnetic wave, namely in such a manner that the thickness of the semiconductor structure 5 will be at least ¼ of the wavelength of the lowest frequency of the incident electromagnetic radiation. The proposed geometry design will ensure the resulting resonance characteristic according to FIG. 10 and depends on the shape of resonator (dipole, split ring circle shape, split ring rectangle shape, patch, spot resonators).

After impinging on the incidence plane 3, the electromagnetic wave permeates through the semiconductor structure 5. Along the upper plane of the semiconductor structure 5 at the location of the incidence plane 3 extends the first part of the resonator 4, whereas the second part extends within the semiconductor structure 5 (as illustrated in FIG. 3 or 4). The semiconductor structure 5 is instrumental towards setting conditions of the electric and magnetic components maxima in the incidence plane 3 of the electromagnetic wave and is measurable as the reflection coefficient is less than 0.5 from the interval of <−1,1>. In this respect, the semiconductor structure 5 is formed by the layer 5a with minimum electromagnetic damping, whose function is to allow the impinging electromagnetic wave on the semiconductor structure 5 to link and create a resonant region with a maximum resonance in the incidence plane 3. The layer 5b with electromagnetic damping is instrumental towards slow damping of the advancing electromagnetic wave, which progresses in the direction from the incidence plane 3 towards internal structures of the semiconductor structure 5 and causes a condition in which there occurs minimum reflection of the advancing wave from the reference electrode 11 back to the layers 5b and 5a. The main function of the layer 5b with electromagnetic damping is to prevent the electromagnetic wave at the end of the semiconductor structure 5 from bouncing back and allowing the generation of a standing electromagnetic wave. The dimensions of the layer with minimum electromagnetic damping 5a as well as the layer with electromagnetic damping 5b are selected to be, at the minimum, equal to or greater than ¼ of the wavelength of the impinging electromagnetic wave 1 (for example, both layers may show the thickness of 10 μm for the selected type of material).

By achieving the resonant state, in at least one photovoltaic element within the group of periodically repeating elements there occurs a multiple increase of amplitudes of the original impinging electromagnetic wave, and for the assumed wavelength of the electromagnetic wave 1 impinging on the incidence plane 3 of the semiconductor structure 5, there can be obtained an electric voltage applicable for further processing by the electric circuit 12 that manages the performance and mode of the periodic structure designed for energy harvesting (energy exploitation, "power management").

A high-quality conductor is applied as the material of conductive paths formed in the incidence plane 3, on which the first part of the resonator 4 is arranged; the same high-quality conductor is also used for the material of coupled conductors 8, the connecting element 9 and the material of the nonlinear element 15. The layer 5a with minimum electromagnetic damping is formed by a combination of the dielectric material 10 and a conductive and/or semiconductor material. The layer 5b with electromagnetic damping is formed by a material change in the specific conductivity, which increases in the direction from the electromagnetic wave 1 incidence plane 3. In the layer 5b with electromagnetic damping, the specific conductivity is set so that the reflection coefficient is less than 0.5 from the interval of <−1,1>.

The designed semiconductor structure 5 of the photovoltaic element operates in the resonant state, which enables the invention to advantageously obtain on the resonator 4 multiple (2-1000) values of amplitude of the electric component of the impinging electromagnetic wave 1.

The proposed periodic arrangement allows operation in the resonant mode for frequencies f with a change of frequency Δf. It is possible to achieve a parameter Δf/f at the interval of 0.5 to 1.5.

The solution known from prior art using antennas and standard resonant circuits usually makes it possible to achieve only the rate of Δf/f at the interval of 0.9 to 1.1. The solution according to the invention, due to the absorption characteristics of the region with electromagnetic damping 5b and the dimensions with respect to the wavelength, allows the achievement of the above-noted rate of Δf/f. This condition can be advantageously utilized for the design of an optimal semiconductor structure 5 and for approaching the ideal state of 100% exploitation rate as related to the transformation of the electromagnetic wave 1 incident on the elements to the generator output.

A necessary prerequisite for the utilization of the basic element (at the very minimum) as an electric energy source is in connecting the external electric circuit 12, which allows that, at any loading (external impedance load 13 assumes the values from the interval 0 to ∞ Ohms) of the output of the circuit 12, and the variation of the external electric impedance load 13 on the input of the circuit 12 will not manifest itself. Thus, the basic component or group of components will remain in the resonant state.

INDUSTRIAL APPLICABILITY

The described photovoltaic element can be utilized as a harvester or a generator of electric energy, possibly also as a sensor or a nonlinear converter.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

REFERENCE SIGNS 1 electromagnetic wave
2 wave impingement point
3 incidence plane
4 resonator 5 semiconductor structure
5a layer with minimum electromagnetic damping
5b layer with electromagnetic damping
6 boundary of two layers
7 reflector
8 coupled conductors
9 connecting element of resonators
10 dielectric material
11 reference electrode
12 electric circuit
13 electric impedance load
14 inductor
15 nonlinear element
16 connecting element
17 second capacitor
18 first capacitor
19 source of current/voltage caused by induction from electromagnetic wave
41 organic layer
42 impedance matching layer
43 peak height
44 peak bottom width
45 partially permeable mirror

What is claimed is:

1. A photovoltaic element comprising a resonator, the photovoltaic element comprising:
a semiconductor structure comprising a first layer comprised of a first semiconductor material and a second layer comprised of a second semiconductor material, an upper plane of the first layer comprising an incidence plane of an electromagnetic wave onto the semiconductor structure, the second layer continuing beyond the first layer in the direction of propagation of electromagnetic radiation to receive at least a portion of the electromagnetic radiation having passed through the first layer;
at least one resonator comprising a first part and a second part, the first part of the resonator extending along the upper plane of the first layer, and the second part of the resonator extending within the first layer and the second layer of the semiconductor structure; and
a reference electrode bordering at least a portion of the second layer, the reference electrode being coupled to the second layer in a direction of propagation of the electromagnetic wave to receive the remaining portion of the electromagnetic wave having passed through the preceding layers of the semiconductor structure.

2. The photovoltaic element according to claim 1, wherein the first part of the resonator is comprised of a first pair of electrodes in the form of first coupled conductors arranged in the upper plane on top of the first layer, while the second part of the resonator is comprised of a reflector and a dielectric material, the reflector being surrounded by the dielectric material that extends within the first layer and the second layer.

3. The photovoltaic element according to claim 2, wherein the reflector is arranged orthogonally to the upper plane of the first layer.

4. The photovoltaic element according to claim 1, wherein the second semiconductor material is characterized by a higher specific conductivity than the first semiconductor material.

5. The photovoltaic element according to claim 1, wherein the first part of the resonator is comprised of a layer of periodically-structured organic material and is arranged under an impedance matching layer of a given height, said height being at least ¼ of the wavelength of an incident electromagnetic wave.

6. The photovoltaic element according to claim 5, wherein the organic material is comprised of a periodical repetition of monomers selected from the group consisting essentially of 4,4'-di-(1,4-buta-1,3-diynyl)benzoic acid, 4,4'4"-tris(diphenylamino)triphenylamine, 1,3,5-tris(diphenylamino)benzene and 1,3,5-tris[4-(diphenylamino)phenyl]benzene, or a combination thereof.

7. The photovoltaic element according to claim 1, wherein in the first semiconductor material, the amplitude of the electromagnetic wave decreases by less than 10 percent.

8. The photovoltaic element according to claim 7, wherein in the second semiconductor material, the amplitude of the electromagnetic wave decreases by 10 percent or more.

9. The photovoltaic element according to claim 1, wherein in the second semiconductor material, the amplitude of the electromagnetic wave decreases by 10 percent or more.

* * * * *